United States Patent
Breen et al.

(10) Patent No.: US 8,973,886 B2
(45) Date of Patent: *Mar. 10, 2015

(54) ACTUATOR INCLUDING MECHANISM FOR CONVERTING ROTARY MOTION TO LINEAR MOTION

(71) Applicant: Bose Corporation, Framingham, MA (US)

(72) Inventors: John J. Breen, Southborough, MA (US); Mark A. Hayner, Belmont, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/707,973

(22) Filed: Dec. 7, 2012

(65) Prior Publication Data

US 2013/0092814 A1     Apr. 18, 2013

Related U.S. Application Data

(63) Continuation of application No. 12/732,321, filed on Mar. 26, 2010, now Pat. No. 8,360,387.

(51) Int. Cl.
*F16M 13/00* (2006.01)
*B60N 2/50* (2006.01)
*F16F 15/03* (2006.01)

(52) U.S. Cl.
CPC ............ *B60N 2/501* (2013.01); *B60G 2202/42* (2013.01); *B60N 2/502* (2013.01); *B60N 2/506* (2013.01); *F16F 15/03* (2013.01); *F16F 2232/04* (2013.01)
USPC ........... 248/584; 248/421; 248/580; 248/593; 74/89; 267/136; 297/217.3

(58) Field of Classification Search
CPC ................. B60G 2202/42; B60G 2202/422; B60N 2/501; B60N 2/502; F16F 2232/04
USPC ........ 248/584, 421, 580, 593; 74/89; 267/131, 136; 297/217.3; 318/560; 123/90.11; 310/80
See application file for complete search history.

(56) References Cited

U.S. PATENT DOCUMENTS 2,206,901 A * 7/1940 Klotsch ................... 267/280
2,527,910 A  10/1950 Braden
(Continued)

FOREIGN PATENT DOCUMENTS

CN    1367744 A    9/2002
CN    1396393 A    2/2003
(Continued)

OTHER PUBLICATIONS

Nobukazu Hoshi & Atsuo Kawamura, Experimental Discussion on the Permanent Magnet Type Anti-Directional Twin Rotary Motor Drive for Electric Vehicle, pp. 425-429.
(Continued)

*Primary Examiner* — Anita M King
(74) *Attorney, Agent, or Firm* — Bose Corporation

(57) ABSTRACT

An active vibration control device is provided that is configured to control the position of a body relative to a reference frame. The control device includes sensors that provide input signals corresponding to movement of the body in at least one direction, a rotary rotary actuator configured to control the position of the body, and four-bar linkage connecting the rotary rotary actuator to the body. The linkage converts the rotary motion output from the rotary actuator into a linear motion of the body. The controller, based on the input signals from the reference frame sensors, provides control signals to the rotary rotary actuator which acts through the linkage to position the body in the at least one direction relative to the position of the reference frame.

10 Claims, 16 Drawing Sheets

(56) References Cited

U.S. PATENT DOCUMENTS

| | | | |
|---|---|---|---|
| 2,590,711 A * | 3/1952 | Krotz | 267/278 |
| 2,681,686 A | 6/1954 | Sheron | |
| 3,684,243 A | 8/1972 | Andersen-Vie | |
| 4,030,208 A * | 6/1977 | Carver et al. | 434/46 |
| 4,989,161 A * | 1/1991 | Oaki | 700/261 |
| 5,315,890 A | 5/1994 | Long | |
| 5,536,059 A | 7/1996 | Amirouche | |
| 5,580,027 A | 12/1996 | Brodersen | |
| 5,797,469 A * | 8/1998 | Gerigk | 180/441 |
| 5,954,400 A | 9/1999 | Brodersen | |
| 5,975,508 A | 11/1999 | Beard | |
| 6,059,253 A | 5/2000 | Koutsky et al. | |
| 6,082,715 A | 7/2000 | Vandermolen | |
| 6,120,082 A | 9/2000 | Vandermolen | |
| 6,193,297 B1 | 2/2001 | Vandermolen | |
| 6,199,820 B1 * | 3/2001 | Ritchie | 248/550 |
| 6,371,459 B1 | 4/2002 | Schick et al. | |
| 6,467,748 B1 | 10/2002 | Schick et al. | |
| 6,786,896 B1 * | 9/2004 | Madhani et al. | 606/1 |
| 6,866,236 B2 | 3/2005 | Mullinix et al. | |
| 6,886,650 B2 | 5/2005 | Bremner | |
| 6,935,693 B2 | 8/2005 | Janscha et al. | |
| 7,694,946 B2 | 4/2010 | Shoemaker et al. | |
| 7,887,033 B2 | 2/2011 | Shoemaker et al. | |
| 7,950,727 B2 | 5/2011 | Haeusler et al. | |
| 7,983,813 B2 | 7/2011 | Ummethala et al. | |
| 8,095,268 B2 | 1/2012 | Parison et al. | |
| 8,342,541 B2 | 1/2013 | Wurmthaler et al. | |
| 8,360,387 B2 | 1/2013 | Breen et al. | |
| 8,413,942 B2 | 4/2013 | Ward | |
| 8,444,123 B2 | 5/2013 | Shoemaker et al. | |
| 8,690,114 B2 | 4/2014 | Boyarski | |
| 2001/0030400 A1 * | 10/2001 | Zetterstrom | 280/5.51 |
| 2003/0201660 A1 | 10/2003 | Janscha et al. | |
| 2004/0144906 A1 | 7/2004 | Hill et al. | |
| 2005/0043718 A1 * | 2/2005 | Madhani et al. | 606/1 |
| 2006/0237885 A1 * | 10/2006 | Paillard et al. | 267/140.15 |
| 2006/0261647 A1 * | 11/2006 | Maas et al. | 297/216.1 |
| 2007/0278025 A1 | 12/2007 | Shoemaker et al. | |
| 2009/0001679 A1 | 1/2009 | Kajino et al. | |
| 2009/0064808 A1 | 3/2009 | Parison et al. | |
| 2009/0256293 A1 | 10/2009 | Ward | |
| 2009/0283944 A1 | 11/2009 | Schordine | |
| 2010/0066142 A1 | 3/2010 | Gross et al. | |
| 2010/0320357 A1 | 12/2010 | Ummethala et al. | |
| 2011/0233364 A1 | 9/2011 | Breen et al. | |
| 2011/0290978 A1 | 12/2011 | Keen | |
| 2013/0092814 A1 | 4/2013 | Breen et al. | |

FOREIGN PATENT DOCUMENTS

| | | | |
|---|---|---|---|
| EP | 1354731 A1 * | 10/2003 | |
| EP | 2390133 A1 | 11/2011 | |
| FR | 2761643 A1 | 10/1998 | |
| GB | 2333340 A | 7/1999 | |
| JP | H06193676 A | 7/1994 | |
| JP | 2009-006798 A | 1/2009 | |
| JP | 2009-208589 A | 9/2009 | |
| JP | 4406979 B2 | 2/2010 | |
| WO | 9011841 A1 | 10/1990 | |

OTHER PUBLICATIONS

First Chinese Office Action dated Dec. 18, 2013 for Chinese Patent Application No. 201180016106.5.
International Search Report and Written Opinion dated Jul. 24, 2014 for International application No. PCT/US2014/026992.
CN Office Action dated Jul. 31, 2014 for 201180016106.5.
International Search Report and Written Opinion dated Jun. 23, 2014 for International application No. PCT/US2014/027209.
Caterpillar Comfort Seats; 2003 Caterpillar.
JP Office Action dated Mar. 19, 2014 for JP 2012-555214.
Noguchi, Shoichi; Transmission Device and Experimental Technique, Japan, Joint-stock company Kyoritsusya, May 28, 1937, p. 21, figure 28(a). [No English version available].
Hattori, Toshio; Applied Mechanics, Japan, Gihodo, Sep. 15, 1972, first edition, fourth printing, p. 138, 5D driving, (Figure 323) [No English version available].
JP Office Action dated Sep. 19, 2014 for JP 2012-555214.

* cited by examiner

ACTUATOR INCLUDING MECHANISM FOR CONVERTING ROTARY MOTION TO LINEAR MOTION

CROSS REFERENCE TO RELATED APPLICATIONS

This application is a continuation application of U.S. patent application Ser. No. 12/732,321, published as U.S. Published Pat. App. 2011-0233364-A1, entitled "Actuator Including Mechanism for Converting Rotary Motion to Linear Motion", filed Mar. 26, 2010 by Breen et al., which is herein incorporated by reference in its entirety.

BACKGROUND

Active vibration control systems have been employed to control vehicle seat vibration. For example, as a replacement for passive systems including springs and dampers which reduce seat response to vehicle vibration, active vibration control systems detect seat vibration and control the position of the seat to cancel detected motion and thereby isolate the seat from vehicle vibration. Such active vibration control systems may include a linear actuator controlled by a controller. The linear actuator is positioned below the seat to control seat position relative to the vehicle frame. For example, the linear actuator may include a linear electromagnetic motor, including an armature fixed at one end to the seat. The armature linearly extends and retracts relative to a stator based on control signals from the controller, thereby positioning the seat.

Controlled linear actuators have application to systems other than vehicle seat vibration control. For example, controlled linear actuators are also known to be used in vehicle wheel suspension systems and in engine valve control systems.

In many applications, a challenge associated with using such linear actuators to control object position includes providing a linear motor providing sufficient linear travel within a limited space, for example between the seat and the floor in an active seat vibration control system. Other challenges include known cost and maintenance issues associated with linear motors.

SUMMARY

In some aspects, an active vibration control device configured to control the position of a body includes at least one sensor configured to provide input signals corresponding to movement of the body in at least one direction, a rotary motor configured to control the position of the body, and a linkage including at least two pivotably-joined links connecting the rotary motor to the body. The linkage is configured to convert rotary motion output from the motor into a linear motion of the body. The device further includes a controller which, based on the input signals from the at least one sensor, provides control signals to the rotary motor which acts through the linkage to position the body in the at least one direction.

In another aspect of the invention, an actuator comprises a rotary motor including an output shaft and a motor housing; and a linkage connected to the output shaft of the rotary motor. The linkage includes the motor housing which has a housing pivot pin defining a first rotation axis and a first link fixed to the output shaft. The output shaft defines a second rotation axis, and the second rotation axis is parallel to and spaced apart from the first rotation axis. The first link includes a first link pivot pin disposed at a location spaced apart from the second rotation axis and defines a third rotation axis that is parallel to the first rotation axis. The linkage includes a second link pivotably connected at a first end to the first link pivot pin. The second link includes a second link pivot pin defining a fourth rotation axis that is parallel to the first rotation axis. The second link pivot pin is disposed between the first end of the second link and a predetermined point of the second link. The linkage further includes a third link pivotably connected at a first end to the housing pivot pin and pivotably connected at a second end to the second link pivot pin. During operation of the actuator, rotation of the output shaft results in a linear motion of the predetermined point relative to the housing.

The active vibration control device and actuator may include one or more of the following features: The torque generated by the motor at the body is substantially constant over a 100 degree angular rotation of the output shaft. The linkage is configured to convert the rotary motion of the output shaft to linear motion such that the motion of the body is substantially proportional to the angular displacement of the output shaft over a 180 degree rotation of the output shaft. The linkage is configured to convert the rotary motion of the output shaft to linear motion such that the torque is substantially constant over a range of displacement of the body of at least four inches.

The controller of the active vibration control device provides output signals to the rotary motor which acts through the linkage to position the body such that an attitude of the body controlled. The active vibration control device includes a second linkage, with one of said linkages connected to the output shaft of the motor on each of opposed sides of the motor. The device further includes a second rotary motor and a second linkage configured to control the position of the body, the first and second rotary motors arranged such that their respective rotor axis are parallel. The device further includes a second rotary motor and a second linkage configured to control the position of the body, the first and second rotary motors arranged such that their respective rotor axis are co-linear.

In certain implementations, the body includes a vehicle seat, for example disposed in a vehicle, with the rotary motor, fixed relative to a floor of the vehicle, being disposed between the floor and the seat. The linear travel of the body is at least 4 inches. The controller provides control signals to the rotary motor to position the body according to a motion that is opposed and opposite to the motion detected by the at least one sensor.

The actuator may further include one or more of the following features: The actuator includes a second linkage, and one of the linkages is connected to the output shaft of the motor on each of opposed sides of the motor. Each of the housing pivot pin and the first and second link pivot pins are supported on bearings, and the links are configured such that the bearings are substantially co-planar.

The active vibration control device and the actuator advantageously employ a rotary motor and include a mechanism to converts rotary motion of the motor to linear motion. The actuator has many applications, one of which is to control the position of an object along a linear path. The actuator, in which the rotary motor acts through a mechanical linkage to position the object, has several advantages over known positioning devices which employ linear motors. For example, rotary motors are much less expensive to fabricate and are more easily sealed than a linear motor. In addition, rotary motors, in combination with the mechanical linkage, are more compactly sized than a linear motor while providing equal or greater range of linear motion. This feature is important for example in vibration control of vehicle seats, where the spacing between the seat and floor, in which the control mechanism is disposed, is limited.

Moreover, when combined with a controller, the actuator can be used as a motion control device. For example, in some implementations, the actuator combined with a controller can be used to provide active control of valves in an internal combustion engine or a compressor. In some implementations, the actuator combined with a controller can be configured to act as a position source, a velocity source or a force source. In some implementations, the actuator combined with a controller can be used in an active vibration isolation control device. For example, the actuator and a controller can be used to control the position and/or the acceleration of a vehicle seat, as explained further below, or to control the position and/or acceleration of the sprung mass of a vehicle (i.e. the passenger compartment or an automotive vehicle).

A still further advantage of the actuator is that at least some of the mechanical linkage is incorporated into the motor housing and rotor shaft, providing a actuator that is still more compact, less complex and requires fewer parts. Furthermore, the actuator is a direct drive device in which the rotor is connected to the object to be positioned via a single rigid link, and without any intervening gears, belts or other devices which introduce error and/or complexity into positioning control.

In a further aspect of the invention, a mechanism for converting rotary motion into linear motion comprises a plate including a plate pivot pin defining a first rotation axis, and a first link fixed to a shaft. The shaft is rotatably supported on the plate and defines a second rotation axis, the second rotation axis being parallel to and spaced apart from the first rotation axis. The first link includes a first link pivot pin disposed at a location spaced apart from the second rotation axis and defines a third rotation axis that is parallel to the first rotation axis. The mechanism includes a second link pivotably connected at a first end to the first link pivot pin. The second link includes a second link pivot pin defining a fourth rotation axis that is parallel to the first rotation axis, and the second link pivot pin is disposed between the first end of the second link and a predetermined point on the second link. The mechanism further includes a third link pivotably connected at a first end to the plate pivot pin and pivotably connected at a second end to the second link pivot pin. In the mechanism, rotation of the shaft results in a linear motion of the predetermined point relative to the plate.

The mechanism may include one or more of the following features: The predetermined point moves linearly for about a 180 degree rotation of the shaft. The mechanism includes a first bar length defined by the distance between the first link pivot pin and the shaft, a second bar length defined by the distance between the shaft and the plate pivot pin, a third bar length defined by the distance between the plate pivot pin and the second link pivot pin, and a fourth bar length defined by the distance between the first link pivot pin and the predetermined point, and the ratio of the first bar length to the second bar length to the third bar length to the fourth bar length is 1:2:2.5:5. Each of the plate pivot pin, first and second link pivot pins and the shaft are supported on bearings, and the bars are configured such that the bearings are substantially co-planar. The plate further comprises a stop member configured to limit rotation of the first link relative to the plate.

DETAILED DESCRIPTION

As will be described in greater detail below, an actuator including a rotary driver combined with a linkage having particular mechanical characteristics provides conversion of rotary to linear motion in a manner that is well suited for applications in which the linear range of travel is maximized within a limited space.

Figure 7:
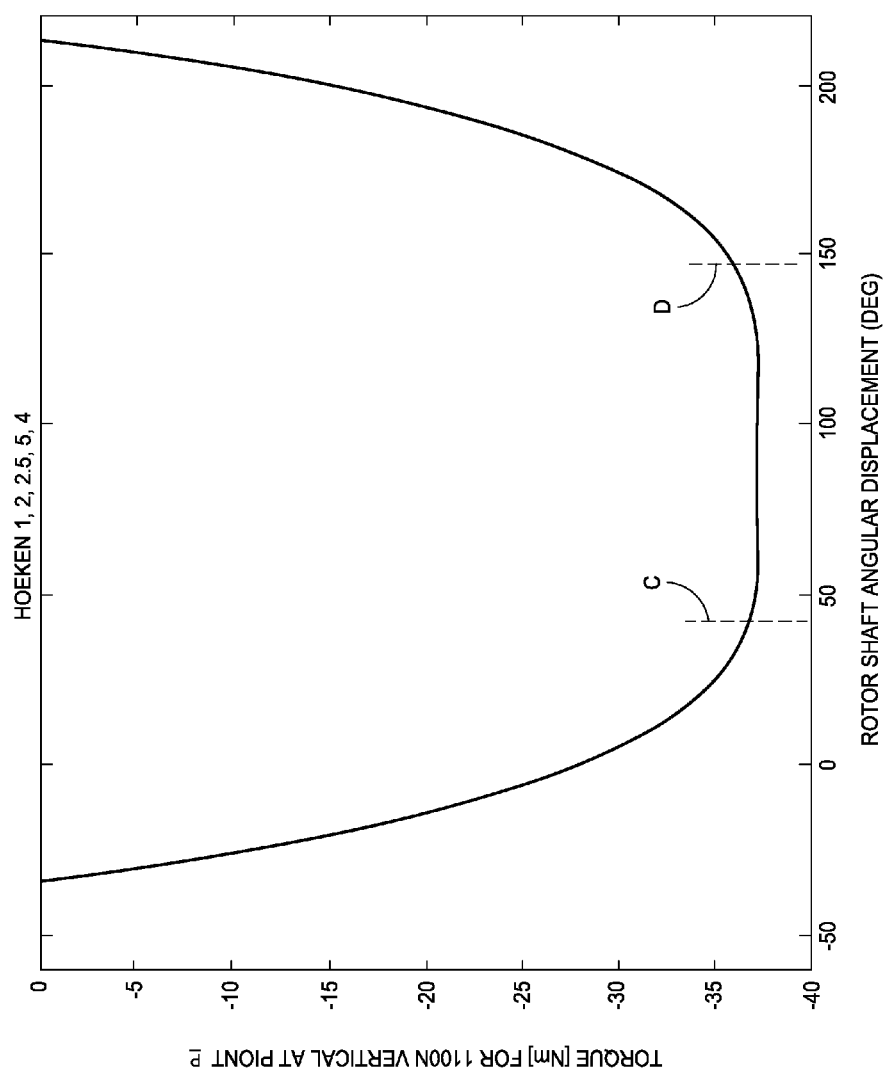
FIG. 7. is a graph of rotor shaft angular displacement (degrees) versus torque (Nm) output of the motor required to provide a constant 1100 N force at the predetermined point of the first link.
Figure 8:
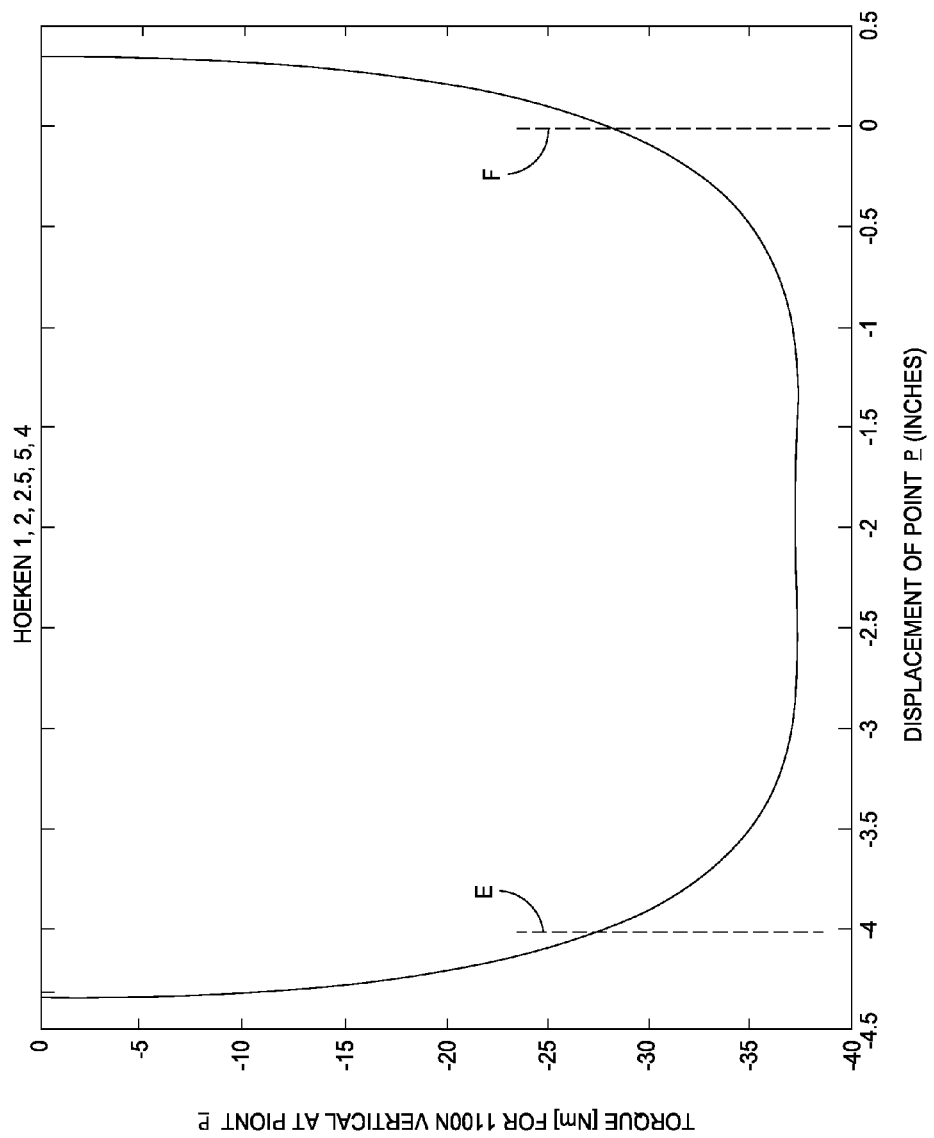
FIG. 8 is a graph of displacement (inches) of the second end of the first link versus torque (Nm) output of the motor required to provide a constant 1100 N force at the predetermined point of the first link.

FIGS. 1, 2, 4 and 6 show an actuator having this desired characteristic in the form of a rotary motor and a four-bar linkage. An alternative implementation of the actuator is shown in FIG. 16. FIGS. 5, 7 and 8 illustrate the mechanical characteristics of the actuator including proportionality of the displacement of a predetermined point on the linkage to the angular displacement of the rotary motor, and a constant force at the predetermined point for both angular displacement as well as displacement of the predetermined point in the linear portion of the motion of the linkage 52 for a constant torque output of the rotary motor. Several implementations of such an actuator when used as a positioning device are shown in FIGS. 9-12. In particular, the actuators are connected to and control movement of a platform. An implementation of the actuator used in an active vibration control system is described with reference to FIG. 13. In addition, an implementation of the actuator used to control engine valves is described with reference to FIGS. 14 and 15.

Figure 1:
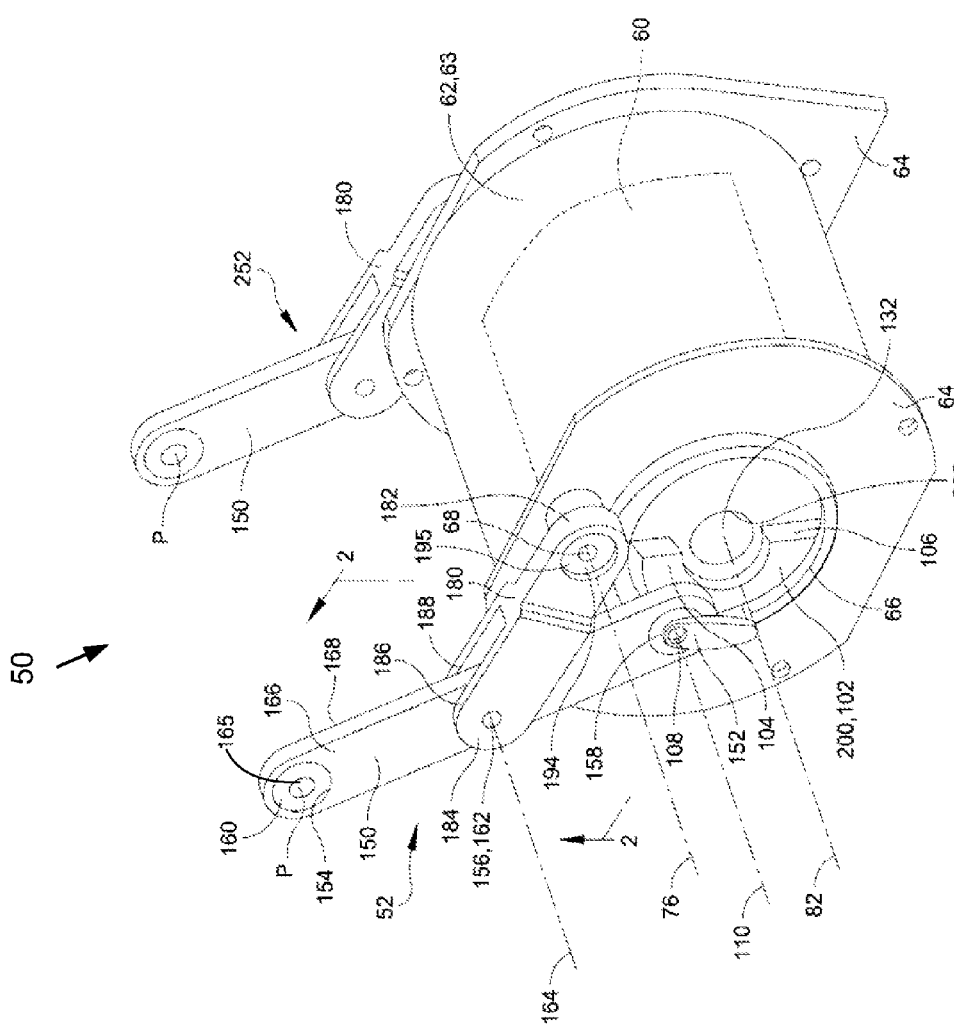
FIG. 1 is a perspective view of an actuator for converting rotary motion to linear motion.
Figure 2:
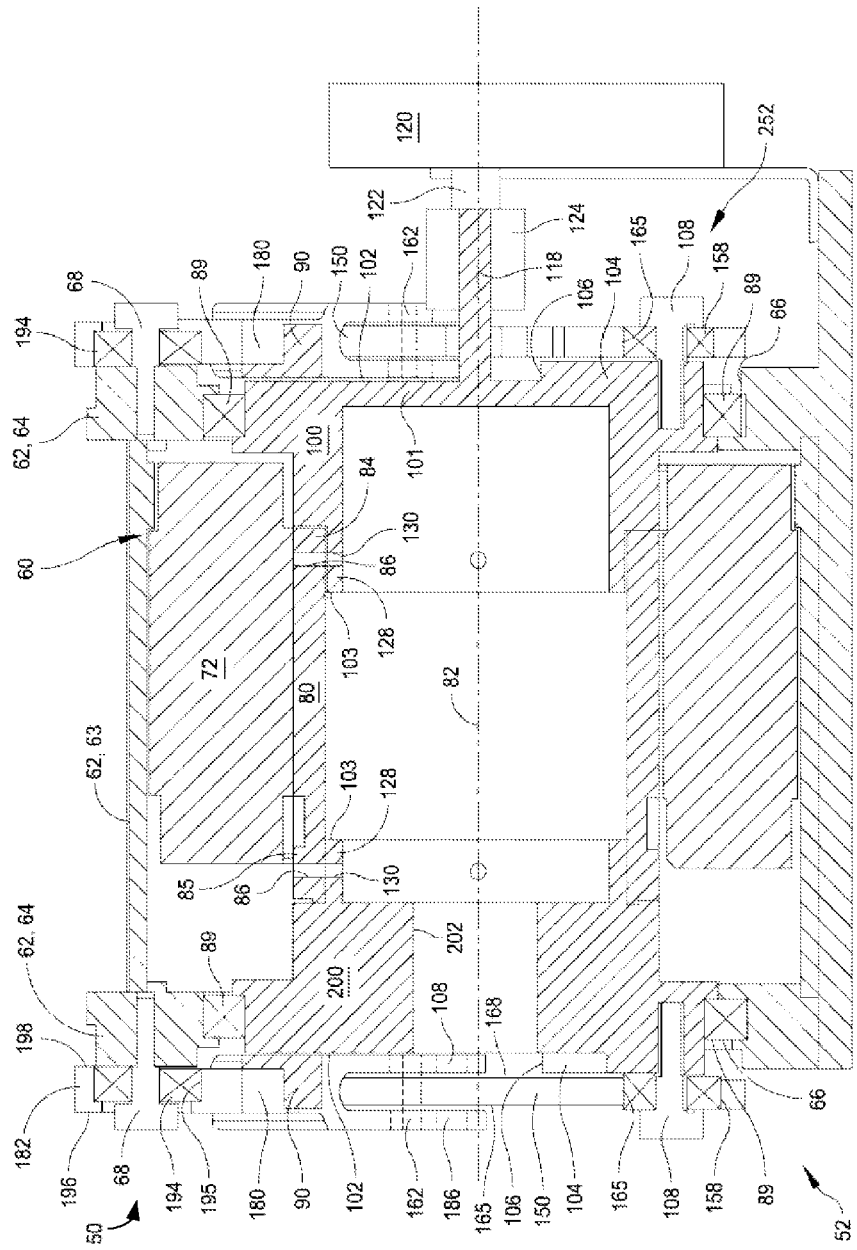
FIG. 2 is a side sectional view of the actuator as seen along section line 2-2 of FIG. 1.

Referring now to FIGS. 1 and 2, the actuator 50 for converting rotary motion to linear motion includes a rotary motor 60 supported by and disposed within a motor housing 62. The actuator includes a first linkage 52 connected to, and driven by, one end of the motor 60. The linkage 52 is arranged as a Hoeken's linkage, and can be used to position an object connected to the linkage along a linear path. The actuator 50 advantageously provides a compact approach to linearly positioning the object in space.

Although object positioning can be achieved using a single linkage 52, in the illustrated implementation, the actuator 50 further includes a second linkage 252 connected to, and driven by, a second end of the motor 60. The second linkage 252 is a minor image of the first linkage 52, and is configured to move synchronously and in concert with the first linkage 52, as discussed further below. Elements common to both linkages 52, 252 are identified by the same reference number. Thus, the configuration of each linkage will be described with reference to first linkage 52 only.

The rotary motor 60 includes a stator 72 fixed to the housing 62, and a rotor 80 disposed coaxially within the stator 72 so as to be rotatable about a rotor axis 82. The rotor 80 is a hollow cylindrical body having opposed first and second ends 84, 85 rotatably supported on the housing 62. The rotary motor 60 may be a conventional frameless kit motor such as model K127300 made by Bayside® Motion Group, of Port Washington, N.Y.

The housing 62 includes closed sidewalls 63 capped at each end by housing end plates 64. Each end plate 64 includes a plate pivot pin 68 that extends outward in a direction parallel to the rotor axis 82, supports a bearing 194, and defines a first rotational axis 76 of the linkage 52. In the illustrated implementation, the plate pivot pin 68, and thus the first rotational axis 76, overlies and is substantially vertically aligned with the rotor axis 82.

An end cap 100 is fixed to a first end 84 of the rotor 80. The end cap 100 is a hollow cylindrical body having a closed first end 101. The end cap 100 is rotatably supported in an opening 66 formed in an end plate 64 of the housing 60 so that the outer surface 102 lies generally within the plane of the end plate 64. Adjacent to the first end 101, an outer periphery of the end cap 100 is supported by a rotor bearing 89 mounted in the housing end plate 64. The rotor bearing 89 may be a thin section bearing such as a Silverthin™ model SB035 angular contact bearing sold by Mechatronics Corporation of Preston, Wash.

The end cap 100 extends inward from the outer surface 102, and terminates at an open second end 103. The outer diameter of the end cap 100 is reduced at the second end 103, forming an annular protrusion 128 sized to be press fit within an inner surface of the rotor 80. Relative rotation of the end cap 100 with respect to the rotor 80 is prevented by securing the end cap 100 to the rotor. This can be achieved, for example, by providing screws (not shown) in mutually aligned screw holes 86, 130 formed in the rotor 80 and annular protrusion 128, respectively. Thus, the end cap 100 rotates with the rotor 80 and serves as an output shaft of the motor 60. The rotational center 132 of the end cap 100 is coaxial with the rotor axis 82, which corresponds to a second rotational axis of the linkage 52.

The outer surface 102 of the end cap 100 includes a protruding step portion 104 formed at the periphery of the end cap 100 in the shape of a segment of a circle, in which the chord defining a side of the segment is not a diameter of the end cap 100. A shoulder 106 is formed which joins the step portion 104 to the remainder of the outer surface 102. An end cap pin 108 is provided in the step portion 104 adjacent to the periphery of the end cap 100. The end cap pin 108 protrudes outwardly from the step portion 104, supports a bearing 158, and defines a third rotational axis 110 of the linkage 52 that extends in parallel to the rotor axis 82.

The motor 60 includes an external optical encoder 120 to determine the angular position of the rotor 80. In this implementation, an encoder shaft 118 protrudes from an outer surface 102 of the first end 101 coaxially with the rotor axis 82. The encoder shaft 118 is connected to the input shaft 122 of the encoder using a flexible coupling 124, permitting accurate determination of the angular position of the rotor 80. However, the actuator 50 is not limited to this configuration. For example, the motor 60 may be provided with an internal encoder.

A second end cap 200 is fixed to a second end 85 of the rotor 80. The second end cap 200 is substantially similar in form and function to that of the first end cap 100, and like elements of the second end cap 200 are identified with the same reference numbers. For this reason, a detailed description of the second end cap 200 will be omitted except to point out the following differences relative to the first end cap 100: The end cap 200 does not include an encoder shaft 118. The end cap 200 is provided with a through hole 202 that is coaxially aligned with the rotor axis 82. The through hole 202 provides access to the interior of rotary motor 60, which is advantageous during assembly and disassembly of the actuator 50.

Figure 3:
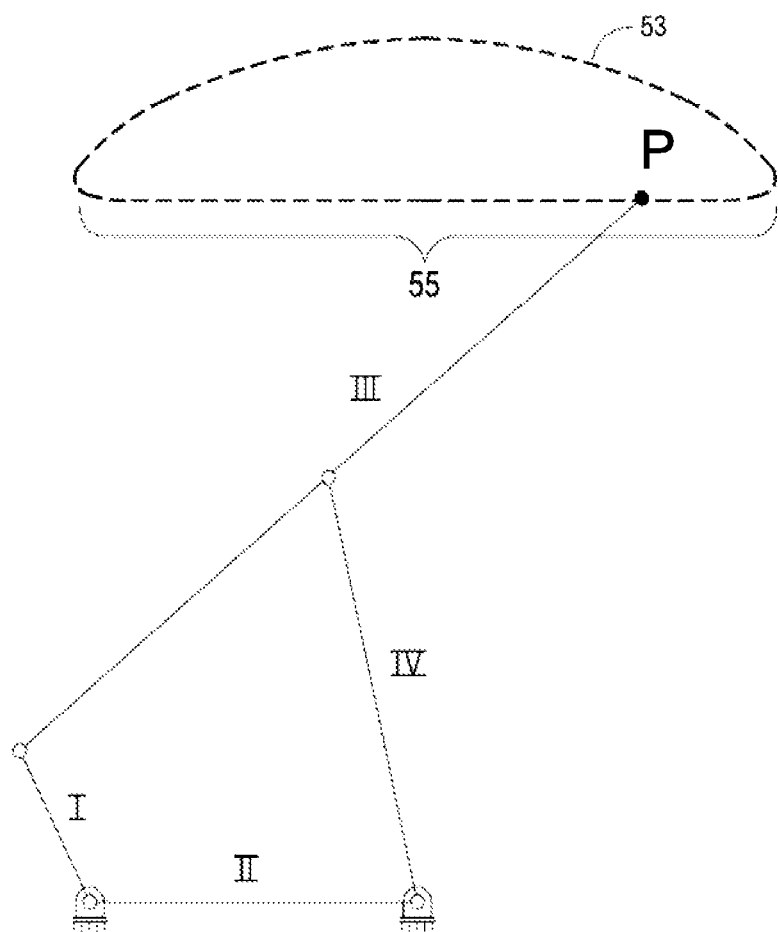
FIG. 3 is a schematic representation of a Hoeken's linkage.

As stated above, the linkage 52 is arranged as a Hoeken's linkage. A Hoeken's linkage is a four-bar linkage that converts rotational motion to approximate straight line motion. With reference to FIG. 3, the Hoeken's linkage includes a rotating first bar I, a fixed second bar II which joins the first bar I to a fourth bar IV, a third bar III driven at one end by the first bar I, and the fourth bar IV which supports a mid portion of the third bar III. Due to the rotation of the first bar I, the point P of the third bar III moves along the closed-loop path 53 indicated by the dashed line. As seen in the figure, the path includes a substantially linear portion 55.

Figure 4:
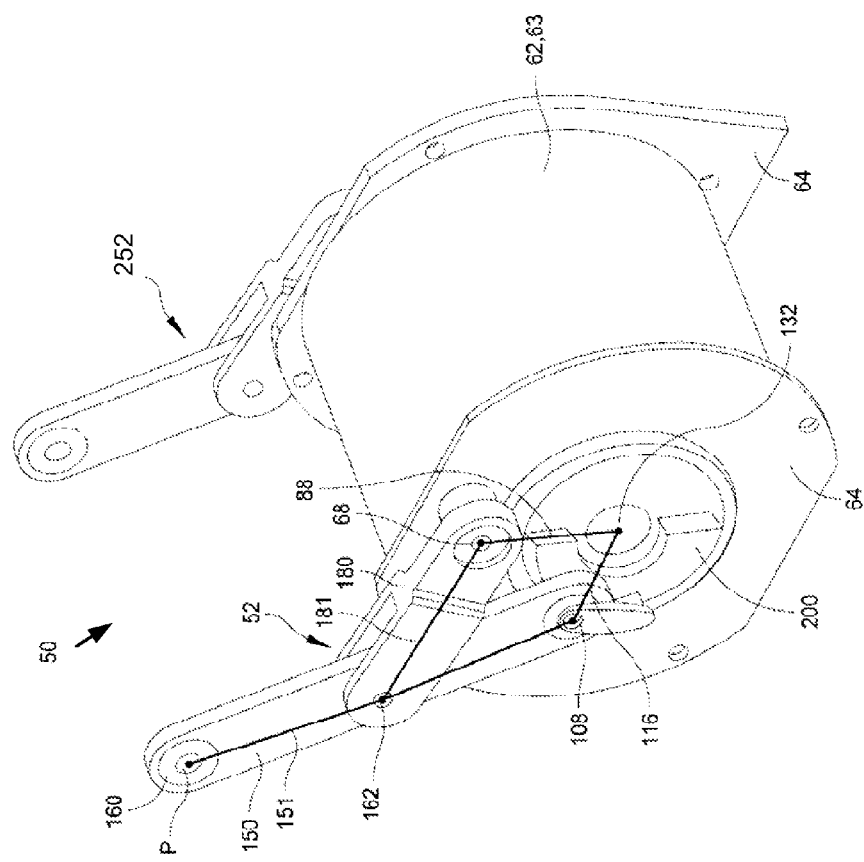
FIG. 4 is a perspective view of the actuator of FIG. 1 illustrating the four bars of the linkage.
Figure 5:
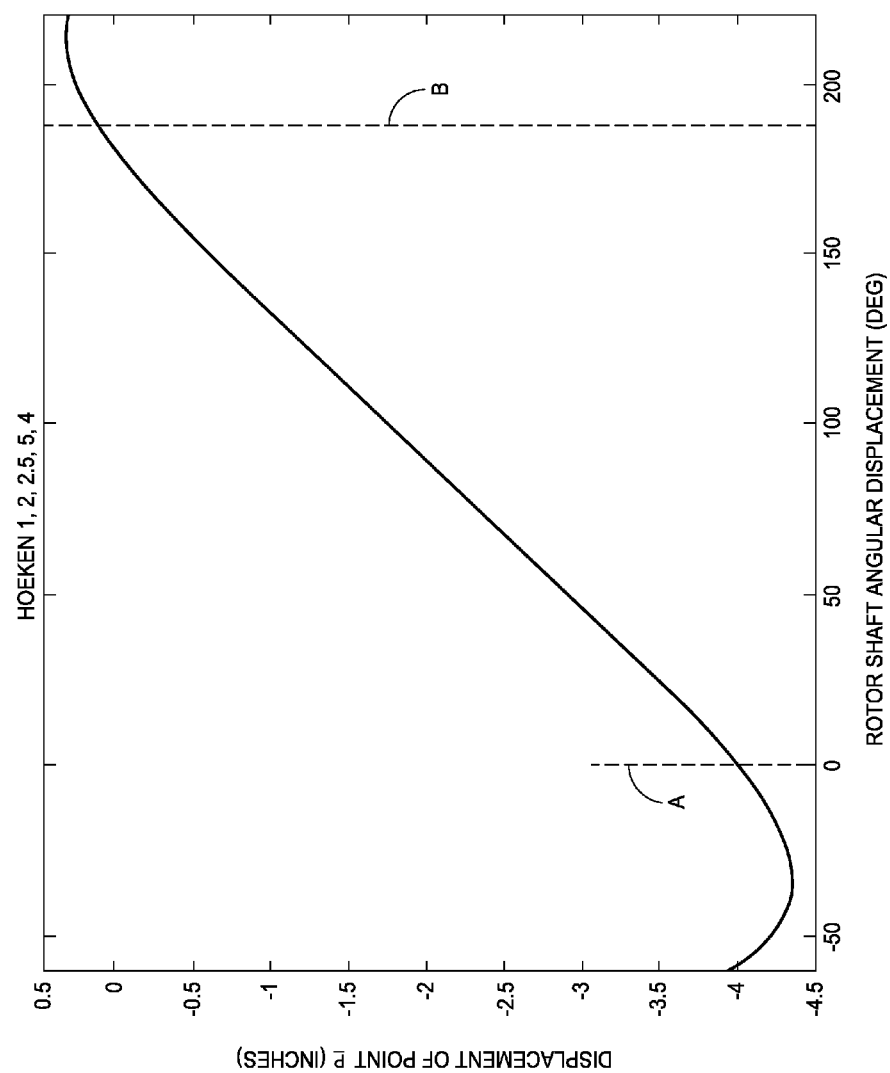
FIG. 5 is a graph of rotor shaft angular displacement (degrees) versus displacement (inches) of a predetermined point of the first link.

Referring to FIG. 4, the four bars of the linkage 52 are defined as follows:

The first bar 116 of the linkage 52 is provided by the end cap 200. More specifically, the first bar 116 includes the portion of the end cap 200 extending between the rotational center 132 of the end cap 200 and the end cap pin 108. The first bar 116 rotates relative to the housing 62 about the second rotational axis 82 in a plane corresponding to outer surface 102 of the end cap 200.

The second bar 88 of the linkage 52 is provided by the housing 62. More specifically, the second bar 88 includes a portion of the end plate 64 and extends between the plate pivot pin 68 and the rotational center 132 of the end cap 200. The second bar 88 is a fixed bar relative to the housing 62, and defines the orientation of the linear motion produced by the linkage 52.

The third bar 151 of the linkage 52 is provided by the first link 150. The first link 150 is an elongate rigid bar of rectangular cross section, and includes a first end 152, and a second end 154 opposed to the first end 152. The first and second ends 152, 154, and the mid point 156 between the first and second ends 152, 154 are provided with through holes 165 that extend between opposed broad faces 166, 168 of the first link 150. The bearings 158, 160, (midpoint bearing not shown) are press fit into the respective through holes 165 and are sized and shaped to receive a pivot pin. For example, the bearing 158 at the first end 152 of the first link 150 receives the end cap pin 108, and permits rotation of the first link 150 about the end cap pin 108 (and third rotational axis 110) relative to the housing 62 and the end plate 100. The bearing disposed at the mid point 156 supports a link pin 162. The link pin 162 protrudes outwardly from both broad faces 166, 168 of the first link 150, and defines a fourth rotational axis 164 of the linkage 52 that extends in parallel to the rotor axis 82. Constituted by the first link 150, the third bar 151 of the linkage 52 extends between the end cap pivot pin 108 and the centerline of the bearing 160 (which coincides with point P in FIG. 4).

The fourth bar 181 of the linkage 52 is provided by the second link 180. The second link 180 is an elongate rigid bar of rectangular cross section, and includes a first end 182, and a second end 184 opposed to the first end 182. The first end 182 is provided with a through hole 195 that extends between opposed broad faces 196, 198 of the second link 180. A bearing 194 is press fit into the through hole 195 and is sized and shaped to receive the plate pin 68. Thus, the first end 182 of the second link 180 rotates about the plate pin 68 (and first rotational axis 76) relative to the housing 62. The second end 184 of the second link 180 is bifurcated so that the distance between the broad faces 196, 198 at the second end 184 is greater that that at the first end 182, and so that the second end 184 forms a yoke including spaced yoke arms 186, 188 which straddle mid portion of the first link 150 and engage the link pin 162. Thus, the second end 184 of the second link 180 rotates about the link pin 162 (and the fourth rotational axis) relative to the housing 62 and the first link 150. Constituted by the second link 180, the fourth bar 181 of the linkage 52 extends between the plate pivot pin 68 and the link pin 162.

By providing the second link 180 with yoke arms 186, 188, the first end 182 of the second link 180 can be arranged to be in the same plane as the first link 150. In addition, by providing the end cap 100 with the step portion 104, and by locating the end cap pin 108 on the step portion 104, a space is provided between the main link 150 and the housing 64 which can accommodate the inner yoke arm 188. In combination, these features advantageously permit the pivot pin bearings 158, 160 and 194, which are conventional radial ball bearings, to be arranged within a single plane, whereby twisting loads on the links are avoided when in use. However, the linkage 52 is not limited to this configuration, and in some embodiments, the second link 180 may be formed without a yoke and may instead be formed having an offset portion or having a linear configuration.

The linkage 52 is used to convert the rotary motion of the rotor 80 into a linear motion at a predetermined point P on the first link 150. In the illustrated implementation, the center of the bearing 160 at the second end 154 of the first link 150 is defined as the predetermined point P at which linear motion is generated. By adjusting the relative lengths of the respective first through fourth bars 116, 88, 150, 180, the motion of the point P can be specified. In the actuator 50, the first bar length is defined by the distance between the end cap pin 108 and the rotational center 132 of the end cap 200, the second bar length is defined by the distance between the rotational center 132 of the end cap 200 and the plate pin 68, the third bar length is defined by the distance between the end cap pin 108 and the point P, and the fourth bar length is defined by the distance between the link pin 162 and the plate pin 68. In the illustrated implementation, the bar lengths are as follows: The first bar 116 is 1 inch, the second bar 88 is 2 inches, the third bar 151 is 5 inches and the fourth bar 181 is 2.5 inches. The range of linear travel which is achieved with this configuration is about 4 inches. Of course, an increased range of linear travel can be obtained by proportionally increasing the size of the bars of the linkage. For example, for respective first through fourth bar lengths of 1.25 inches, 2.5 inches, 6.25 inches and 3.125 inches, the range of linear travel which is achieved is about 5 inches. Conversely, for applications in which a smaller range of linear travel is required, the mechanism can be scaled down, resulting in an even more compact device.

In the linkage 52, the ratio of the first bar length to the second bar length to the third bar length to the fourth bar length is 1:2:5:2.5. By using these proportions, at least the following several advantages are realized:

The linear portion of the motion of the point P occurs along a line that is parallel to the fixed second bar 88. In the illustrated implementation, the fixed second bar 88 is oriented vertically, and thus the linear portion of the motion of the point P also has a vertical motion.

Furthermore, as shown in FIG. 5, the motion of the point P is substantially proportional to the angular displacement of the end cap pin 108 over a 180 degree rotation of the rotor 80. That is, the point P moves approximately linearly within the range of rotational motion of the rotor 80 indicated by reference lines A and B, corresponding to an approximate range of 180 degrees.

In the actuator 50, two external links 150, 180 are provided which respectively serve as the third III and fourth IV bars of the Hoeken's four-bar linkage. The remaining two bars (the first and second bars I, II) are provided by the components of the motor 60 and motor housing 62. Specifically, the second end cap 200 which incorporates the first bar 116 serves as the rotating first bar I of the Hoeken's linkage, and the motor housing 64 which incorporates the second bar 88 serves as the fixed second bar II of the Hoeken's linkage. This configuration, in which the first and second bars 116, 88 are not formed as external links but instead are incorporated into the motor assembly itself, reduces the number of components required to achieve the desired motion, and results in a compact actuator assembly.

Figure 6:
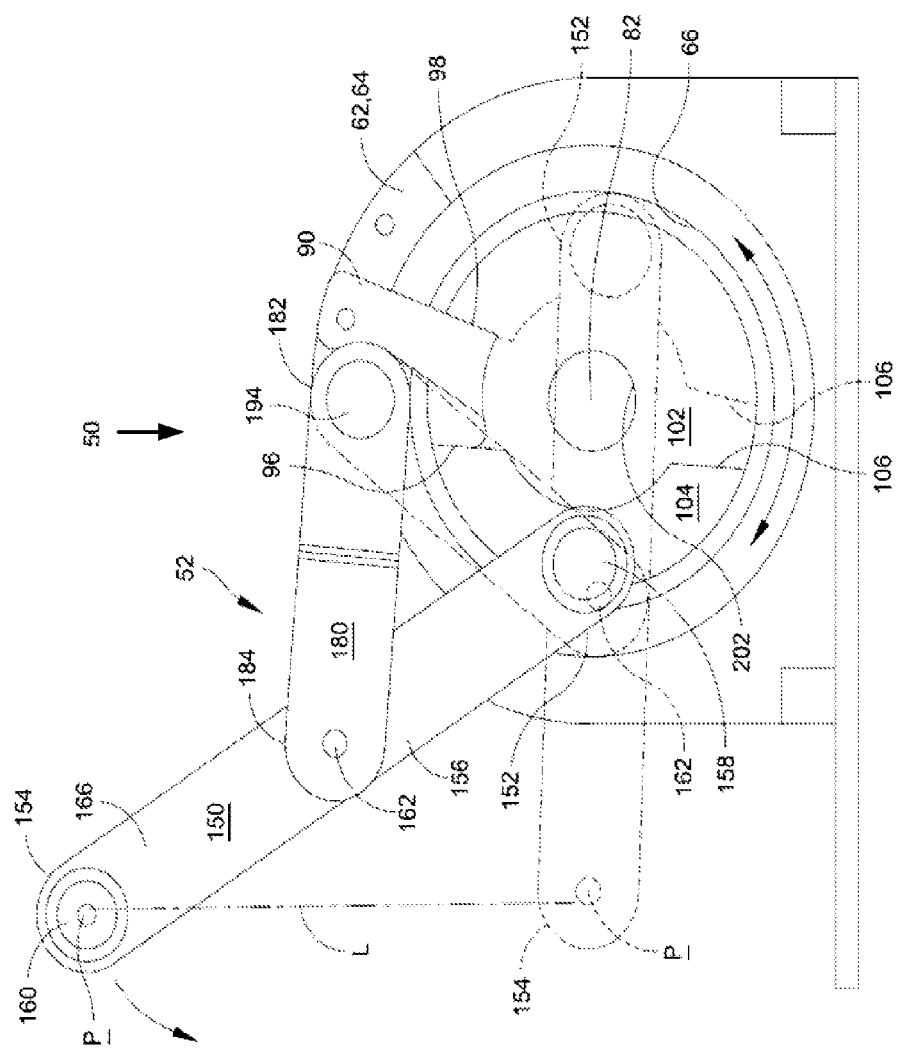
FIG. 6 is an end view of the actuator of FIG. 1.

Referring now to FIG. 6, the actuator 50 is configured so that the second end 154 of the first link 150 is constrained to move back and forth within the linear motion range identified between A and B of FIG. 5. In some implementations, a controller 14 (FIG. 13) connected to the motor 60 prevents the rotor 80, and thus the end cap 100, from rotating beyond the 180 degree range. In addition, a stop member 90 is provided to mechanically interfere with the shoulder 106 of the outer surface 102, whereby rotation beyond the linear range is prevented. The stop member 90 is fixed to the housing 62, and extends radially inward to overlie a portion the opening 66 in the end plate 64. When the linkage is in a fully extended configuration corresponding to one end of the linear range (shown in solid lines in FIG. 4), a first portion the shoulder 106 abuts a first stop surface 96 of the stop member 90. In this position, the first end 152 of the first link 150 is positioned on a horizontal line passing through the rotor axis 82 at a location to the left of the rotor axis 82 as viewed in the figure. In addition, as viewed in the figure, the point P is located at a position that is lateral to, and above an upper side of, the housing 62. When the end cap 100 rotates counterclockwise, the linkage 52 moves downward, and the point P travels downward along a linear path L. When the linkage 52 is in a retracted position corresponding to the opposed end of the linear range (shown in dashed lines in FIG. 4), a second portion of the shoulder 106 abuts a second stop surface 98 of the stop member 90. In this position, the first end of the first link 150 has rotated through a 180 degree arc, and is now positioned on the horizontal line passing through the rotor axis at a location to the right of the rotor axis 82 as viewed in the figure. In addition, the point P is now located at a position that is lateral to, and below an upper side of, the housing 62.

Further advantageously, in one embodiment as shown in FIG. 7, the four-bar linkage 52 is configured to convert the rotary motion of the rotor 80 to linear motion such that the torque output of the motor 60 required to provide a constant 1100N force at the point P is substantially constant over most of the angular displacement range of the motor associated with the linear travel range of the point P. The torque output of the motor 60 is substantially constant within the range of rotational motion of the rotor 80 indicated by reference lines C and D, corresponding to a range of about 100 degrees.

In addition, in one embodiment as shown in FIG. 8, the four-bar linkage 52 is configured to convert the rotary motion of the rotor 80 to linear motion such that the torque output of the motor 60 required to provide a constant 1100N force at the point P is substantially constant over most of the linear range of motion of point P. The torque output of the motor 60 is substantially constant over the majority of the range of tip linear displacement indicated by reference lined E and F, corresponding to about 4 inches.

Figure 9:
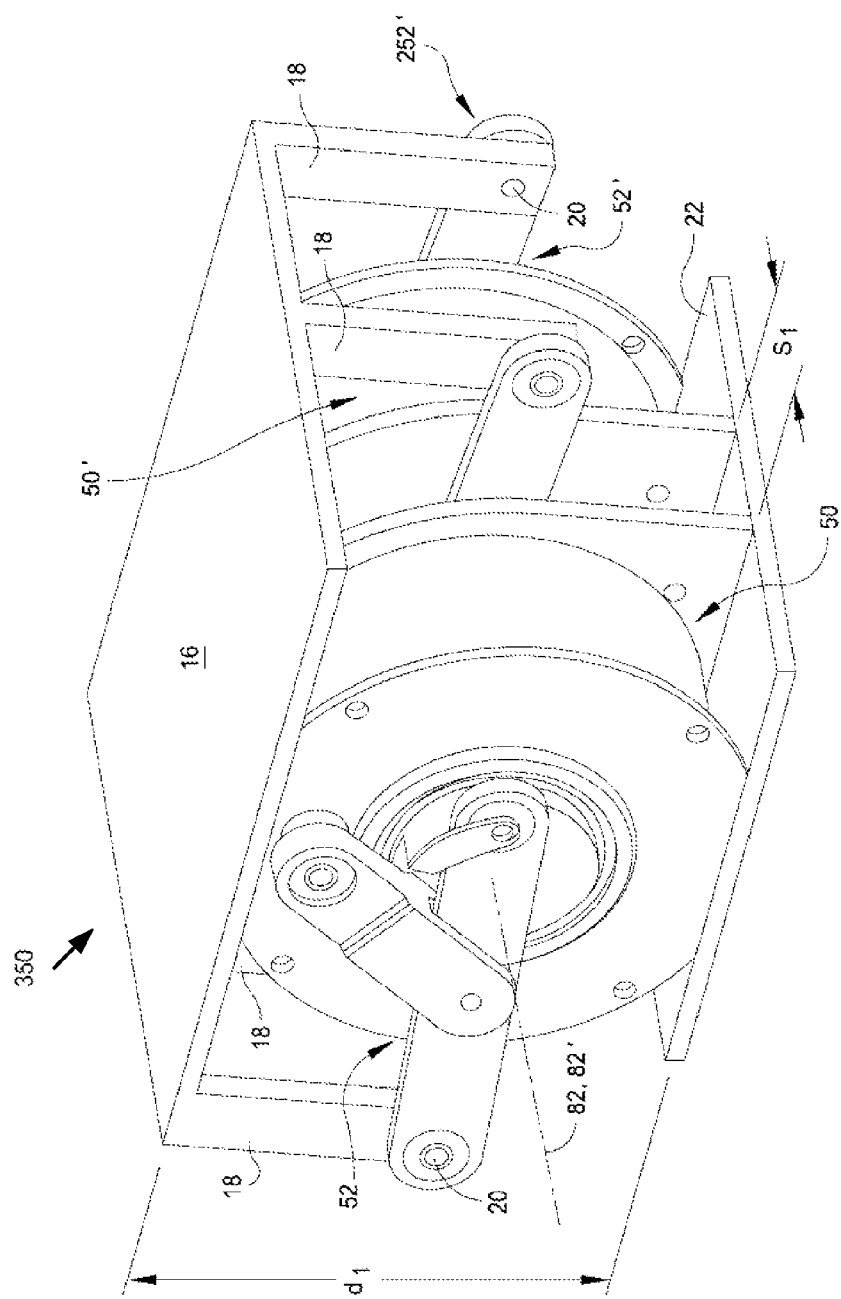
FIG. 9 is a perspective view of a position control device employing two actuators shown in a retracted configuration.
Figure 10:
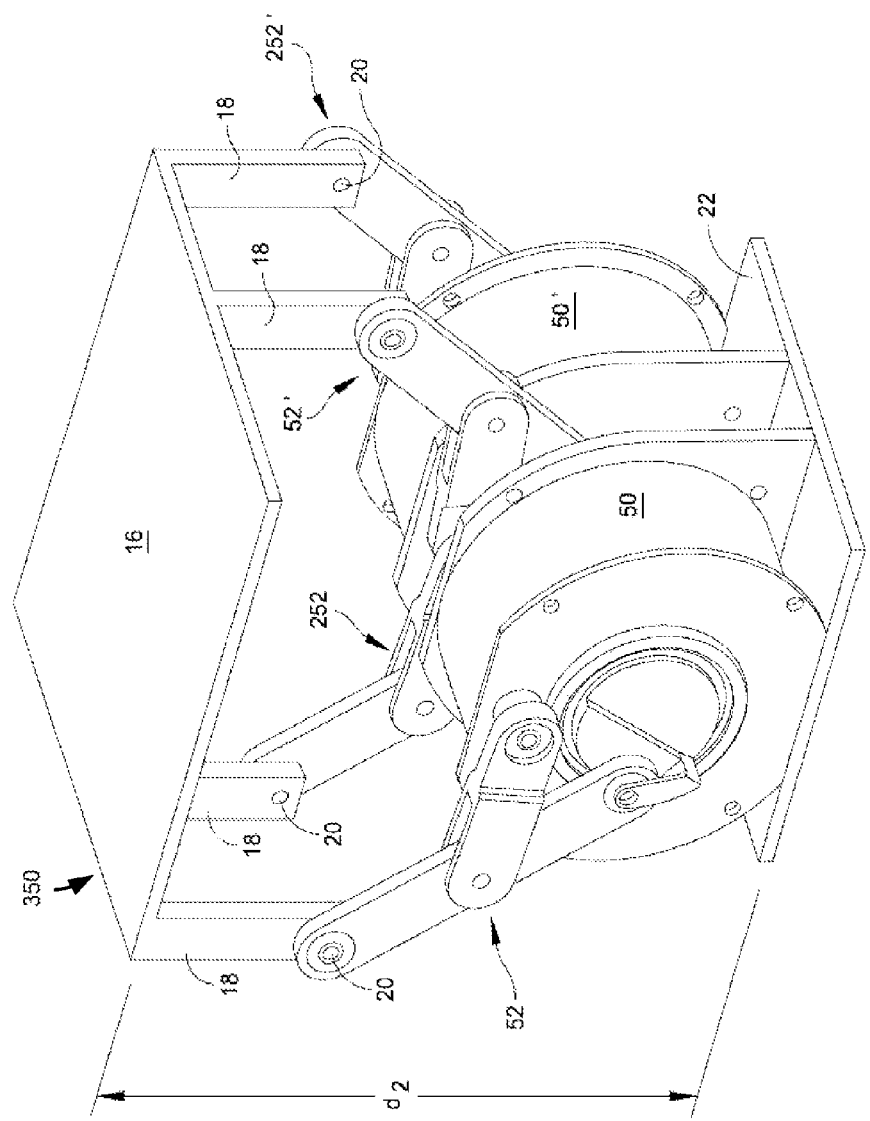
FIG. 10 is a perspective view of the position control device of FIG. 9 shown in an extended configuration.

Referring to FIGS. 9 and 10, the position control device 350 is an implementation of the actuator 50, in which the device 350 includes two actuators 50, 50' arranged such that the rotor axes 82, 82' of the respective rotary motors 60, 60' are substantially coaxial. In addition, the linkages 52, 252 of the first actuator 50 are configured to rotate in opposition to the linkages 52', 252' of the second actuator 50'. In the illustrated implementation, the position control device 350 is used to control the vertical position of a platform 16 relative to a base 22, and is connected to the platform 16 through several downwardly extending legs 18. In particular, each leg 18 includes a pivot pin 20 which is rotatably supported by the bearing 160 at the second end 154 of the respective first link 150 of each linkage 52, 52', 250, 250', a location corresponding to point P. In FIG. 9, the position control device 350 is shown in a first, retracted configuration in which the vertical distance between the platform 16 and the base 22 is a distance d1. In this implementation, there is substantially no vertical spacing between the platform 16 and the housings 62, 62', whereby the retracted configuration is very compact. In addition, the platform 16 is substantially centered over the position control device 350. In FIG. 10, the position control device 350 is shown in a second, extended configuration in which the vertical distance between the platform 16 and the base 22 is a distance d2, where d2 is greater than d1. The platform 16 remains centered over the position control device 350 during the transition between retracted and extended configurations, and while in the extended configuration. Although the illustrated implementation shows the actuators 50, 50' as being axially spaced a distance s1, this configuration is non-limiting. For example, the two actuators 50, 50' may be spaced apart a distance which is greater or less than s1.

Figure 11:
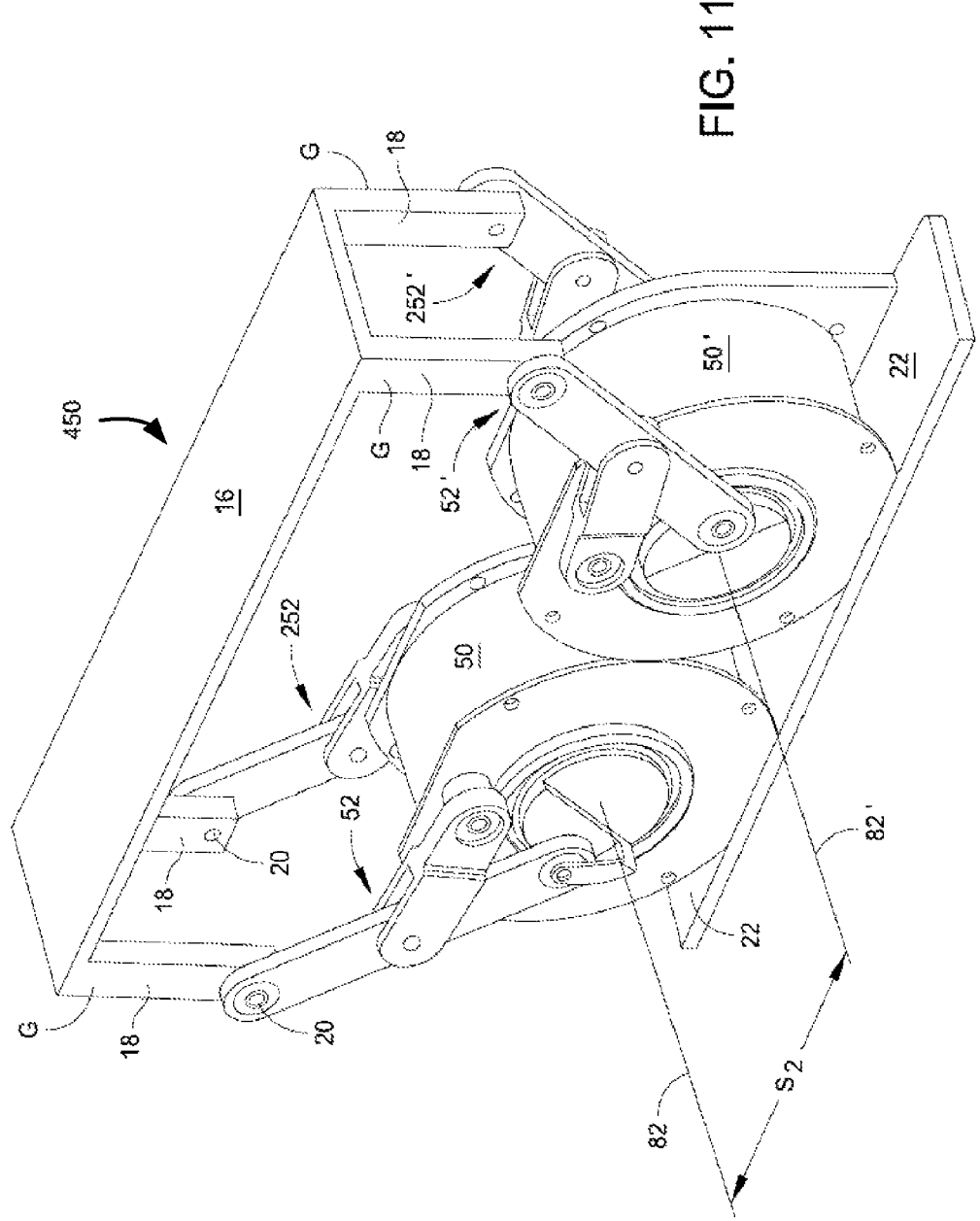
FIG. 11 is a perspective view of an alternative implementation of a position control device employing two actuators.

Referring to FIG. 11, position control device 450 is an alternative implementation of the actuator 50 Like the previous position control device 350, the position control device 450 includes two actuators 50, 50', the second actuator 50' being identical to the first actuator 50. In the position control device 450, the actuators 50, 50' are arranged such that the rotor axes 82, 82' of the respective rotary motors 60, 60' are parallel and spaced apart. In addition, the linkages 52, 252 of the first actuator 50 are configured to rotate in opposition to the linkages 52', 252' of the second actuator 50'. In the illustrated implementation, the position control device 450 is used to control the vertical position of a platform 16 relative to a base 22, and is connected to the platform 16 through several legs 18. In particular, each leg 18 includes a pivot pin 20 which is rotatably supported by the bearing 160 at the second end 154 of the respective first link 150 of each linkage 52, 52', 250, 250', a location corresponding to point P. Although the illustrated implementation shows the axes 82, 82' of the actuators 50, 50' as being spaced a distance s2, this configuration is non-limiting. For example, the axes 82, 82' may be spaced apart a distance which is greater than s2. In addition, although the illustrated implementation shows the actuators 50, 50' as being co-planar, the actuators can instead be offset to lie in different planes while maintaining parallel axes 82, 82'.

Figure 12:
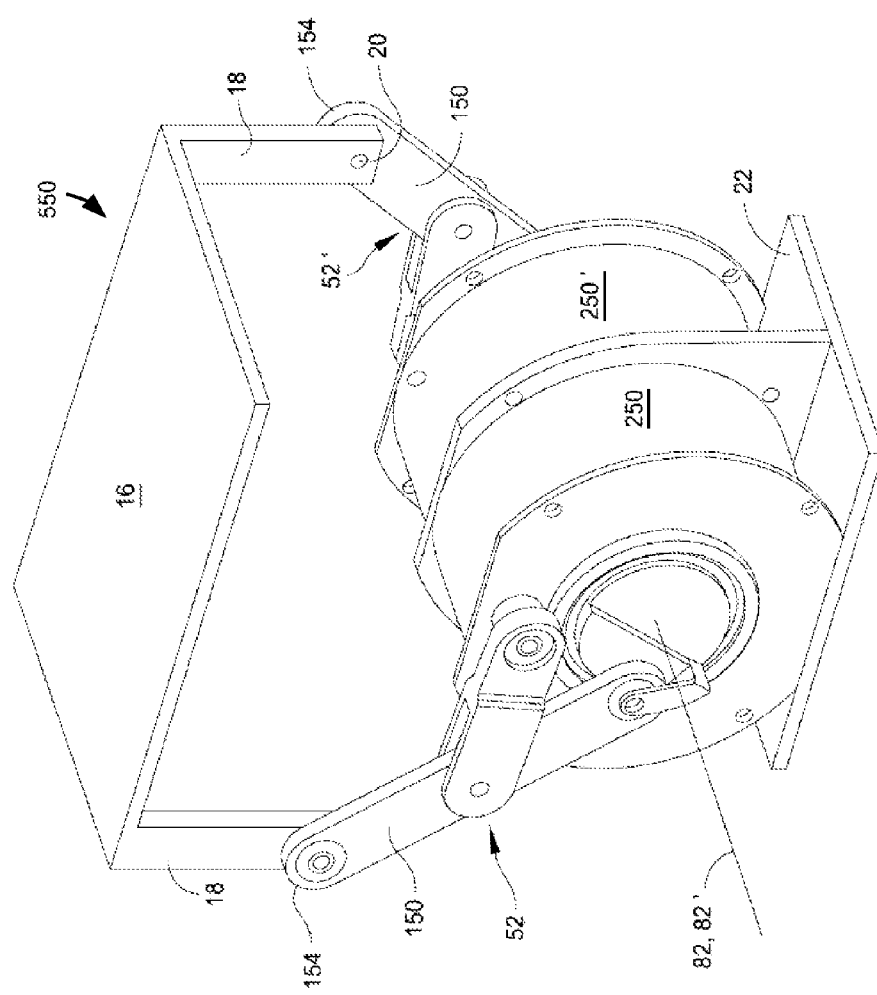
FIG. 12 is a perspective view of another alternative implementation of a position control device employing two single-linkage actuators.

Referring to FIG. 12, position control device 550 is another alternative implementation of the actuator 50. The position control device 550 includes two single-linkage actuators 250, 250'. In particular, each actuator 250, 250' is provided with a single linkage 52, 52'. In the position control device 550, the actuators 250, 250' are arranged such that the rotor axes 82, 82' of the respective rotary motors 60, 60' are coaxial. In addition, the linkage 52 of the first actuator 250 is configured to rotate in opposition to the linkage 52' of the second actuator 250'. In the illustrated implementation, the position control device 550 is used to control the vertical position a platform 16 relative to a base 22, and is connected to the platform 16 through several legs 18. In particular, each leg 18 includes a pivot pin 20 which is rotatably supported by the bearing 160 at the second end 154 of the respective first link 150 of each linkage 52, 52', a location corresponding to point P. The position control device 550 operates similarly to the position control device 350, but is less complex, requires fewer bearings, and is more compact in the axial direction than the position control device 350. Although the illustrated implementation shows the two actuators 250, 250' as being axially abutting, this configuration is non-limiting, whereby the actuators 250, 250' may be axially spaced apart.

In each of the above-described position control devices 350, 450, 550, by using linkage mechanisms arranged on opposing sides, when the actuators 50 move in unison, the respective reaction torques at the base 22 due to the load significantly reduced. In addition, by using two rotary motors 60, 60' to position platform 16 rather than a single rotary motor 60, each of the two rotary motors 60, 60' can be reduced in size, resulting in a mechanism that is even more compact. In addition, in some implementations the respective linkages 52, 252, 52', 252' can be mechanically tied together so that the platform 16 can remain level in the event of failure of one of the rotary motors 60, 60'.

Figure 13:
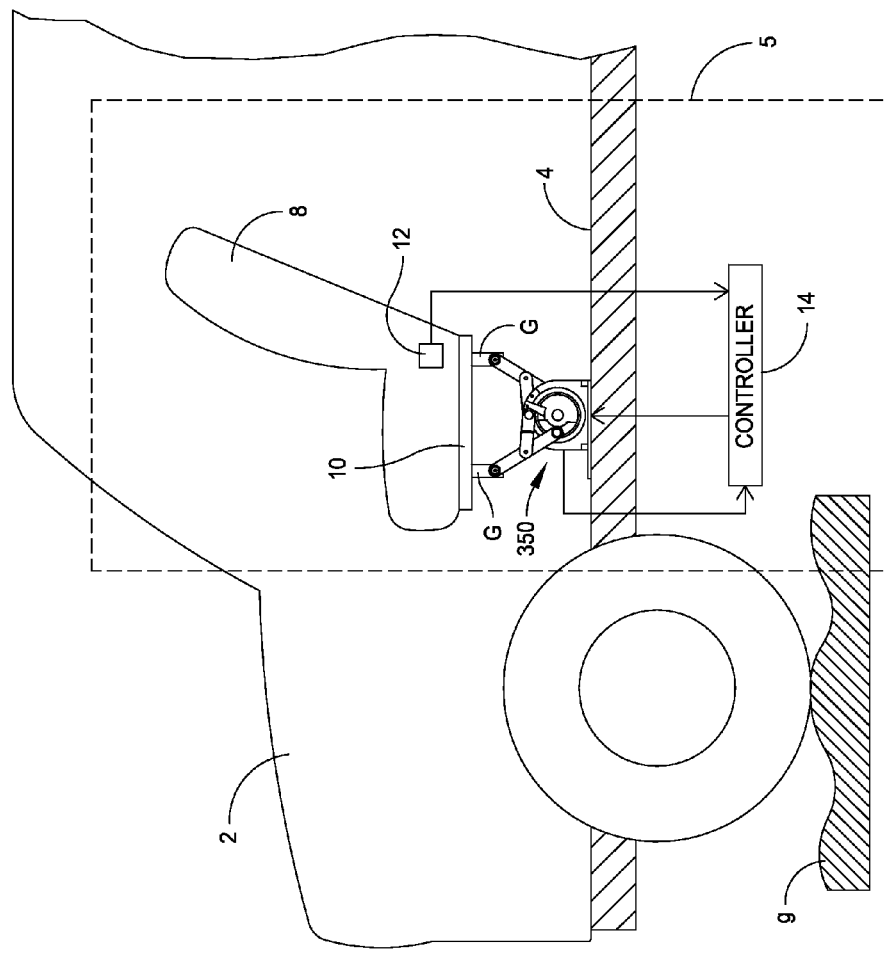
FIG. 13 is a schematic view of an active vibration control system for a vehicle seat.

Referring to FIG. 13, the position control device 350 may be used in an active vibration control system 5 used in a vehicle 2 to mitigate or eliminate vehicle seat 8 vibration resulting from vibration of the vehicle frame 4. The vehicle seat 8 is fixed to a rigid seat base 10, and supports at least one sensor 12. For example, the sensor 12 may include an accelerometer for detecting motion of the seat relative to the ground g. The seat 8 and base 10 rest on and are supported above the vehicle frame 4 by the position control device 350. The position control device 350 may be attached indirectly to the vehicle frame via ancillary seat support structures, or attached directly to the frame itself, whereby the position control device 350 is fixed relative to the vehicle frame 4. The position control device 350 serves to position the base 10, and thus the seat 8, relative to the vehicle frame 4 based on control signals received from a controller 14. The controller 14 receives signals including seat movement data from the sensor 12, and encoder signals indicating rotor position relative to the housing 62, 62'. Based on these signals, the controller 14 outputs control signals to the rotary motors 60, 60' of the position control device 350 such that the position of the vehicle seat 8 is controlled relative to the vehicle frame. Although the illustrated implementation employs the position control device 350, this is non-limiting. For example, any of the disclosed position control devices 450, 550 may be substituted for device 350. Moreover, a single actuator 50, 250 may be used in combination with supplementary seat support structure to form an active vibration control system.

In some implementations, the respective rotary motors 60, 60' are controlled to position the base 10, and thus the seat 8, so as to cancel the detected seat motions in order to isolate the seat 8 from vehicle vibration. In some implementations, the respective rotary motors 60, 60' are controlled to act in concert. For example, the distance of the second end 154 of the first link 150 of both actuators 50, 50' from the vehicle frame 4 is controlled to be the same. In other implementations, the rotary motor 60 of the first actuator 50 may be controlled independently of the rotary motor 60' of the second actuator 50', whereby the attitude of the seat base 10 relative to the vehicle frame 4 may be controlled. In such an implementation, at least one additional degree of freedom would be required between the linkages 52, 252, 52', 252' and the seat base 10 to permit relative motion between these components. This can be accomplished, for example, by providing an additional pivot point at a location G.

The active vibration control system 5, which employs the actuators 50 to convert rotary motion output from the rotary motor 60, 60' into a linear motion, has several advantages relative to a control system employing a linear motor. For example, rotary motors are much less expensive to fabricate and are more easily sealed than a linear motor. In addition, rotary motors, in combination with the mechanical linkage, are more compactly sized than a linear motor while providing equal or greater range of linear motion. This feature is important for example in vibration control of vehicle seats, where the spacing between the seat and floor, in which the control mechanism is disposed, is limited. A still further advantage of the actuator is that at least some of the mechanical linkage is incorporated into the motor housing and rotor shaft, thereby providing a actuator that is even more compact, less complex and requires fewer parts.

Furthermore, in some implementations, the actuator 50 can be a direct drive device in which the rotor is connected to the object to be positioned via a single rigid link, and without any intervening gears, belts or other devices which introduce error and/or complexity into positioning control.

In addition, a further advantage to using the position control device 350 in the active vibration control device 5 lies in the fact that rotary motors are inherently more efficient than linear motors. For example, there are 3 different armature/stator relationships which can be useful in a linear motor: 1) An under hung relationship in which the coils and poles of the stator extend beyond the length of the armature magnets, so that as the magnets move back and forth, the armature for at least some range of travel remains within the stator poles. The design may be such that at maximum excursion the armature still stays within the coils, or it may begin to extend past them at some point. 2) An even hung relationship in which the armature magnets are the same length as the stator poles. In this design, as soon as the armature begins to move, some magnets move outside of the stator poles. 3) An over hung relationship in which the armature magnets exceed the length of the stator poles. In the over hung design, movement of the armature does not change the amount of magnet residing within the stator poles, over at least some excursion range. In this design, the whole excursion range can be used, or just some part.

In any of the above described relationships, a trade off is made between efficiency and cost. For example, as soon as some magnets move outside of the stator poles, their contribution to force output is reduced rapidly. Due to the relatively high expense of the magnets, is desirable to make full use of the magnets all the time.

When used in limited space conditions as found in the active seat vibration control application, and for example, when using an under hung design, it is possible to make full use of the magnets. However, the amount of force produced over the majority of the excursion range for a fixed input current will be less than if more magnets were used. Thus, the efficiency of the linear motor is reduced, where efficiency is defined as output mechanical power divided by input electrical power. An even hung design trades off between these factors.

The advantage in using a rotary motor rather than a linear motor is that it is inherent in the rotary design that all the magnets see the poles of the stator for all angles of rotation. This is an optimum condition for trading off efficiency and cost. For this reason it is advantageous to use a rotary motor and a mechanism for converting rotary motion to linear motion, rather than a linear actuator, for linear positioning applications.

Although the illustrated implementation shows the actuator 50 for converting rotary motion to linear motion used to actively control vibration of a vehicle seat, the actuator 50 is not limited to this application. For example, the actuator 50 is also suitable for use in other aspects of vehicle vibration control including wheel suspension systems and engine vibration control systems. Moreover, the actuator 50 is not limited to vibration control, and has general application to object position control. For example, the actuator can be used to control engine valve motion, whereby engine efficiency can be improved.

Figure 14:
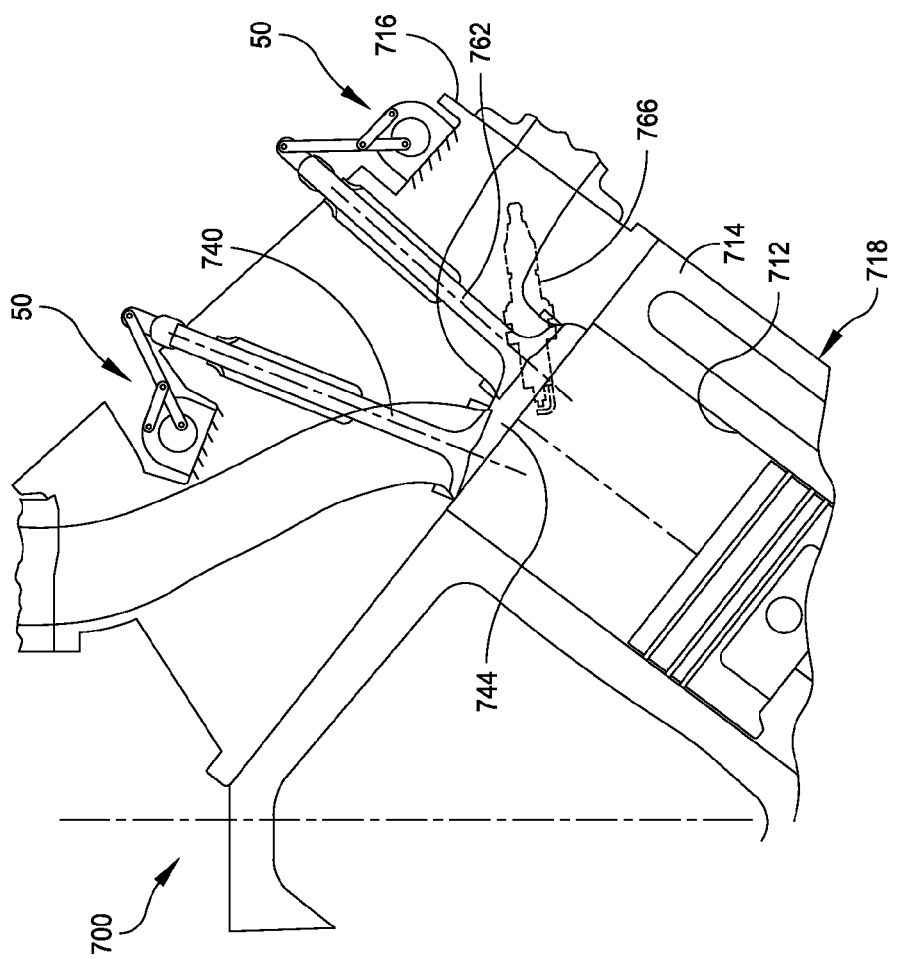
FIG. 14 is a sectional view of a portion of a cylinder bank of an internal combustion engine in which the actuator of FIG. 1 is directly connected to an engine valve.

Referring now to FIG. 14, the actuator 50 may be used in an internal combustion engine 700 to control engine valve position, replacing traditional cam-shaft driven valve trains. The engine 700 has a plurality of cylinders 712 (only one cylinder is shown) disposed in a cylinder block 718 arranged in a V configuration to form cylinder banks 714 with the upper ends of the cylinders 712 being closed by cylinder heads 716. A pair of inlet valves 740 (only one of which is shown) are longitudinally aligned on the inner side of the cylinder 712 and its associated combustion chamber 744, and an exhaust valve 762 is located on the outer side of the cylinder 712. An igniter in the form of a spark plug 766 or similar device is also disposed in the combustion chamber 744 of each cylinder 712.

An actuator 50 is provided for each inlet and exhaust valve 740, 762, and predetermined point P of the first link 150 is pivotably connected to the corresponding valve stem. The actuator 50 serves to position the inlet and exhaust valve 740, 762 relative to the cylinder block 718 based on control signals received from a controller (not shown). The controller receives signals including valve movement data from encoder signals indicating rotor position relative to the housing 62, and crankshaft position data. Based on these signals, the controller outputs control signals to the rotary motor 60 of the actuator 50 such that the position of the valve 740, 762 is controlled relative to the cylinder block 718.

Figure 15:
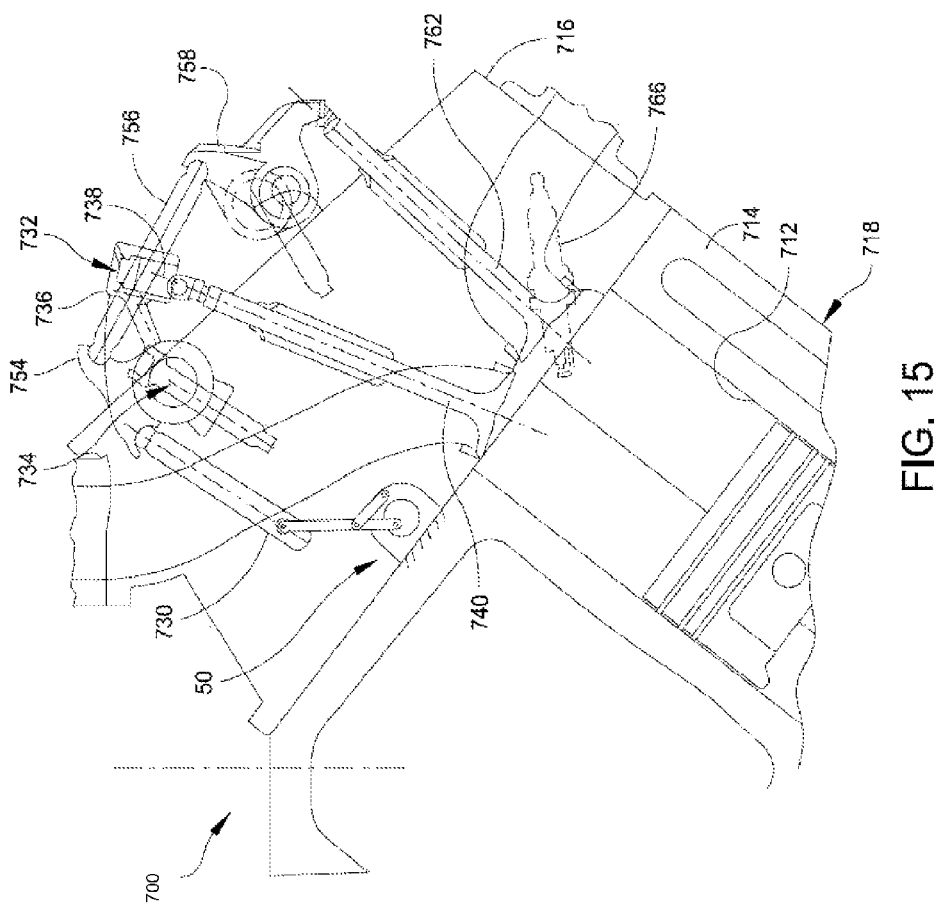
FIG. 15 is a sectional view of a portion of a cylinder bank of an internal combustion engine in which the actuator of FIG. 1 is indirectly connected to an engine valve.
Figure 16:
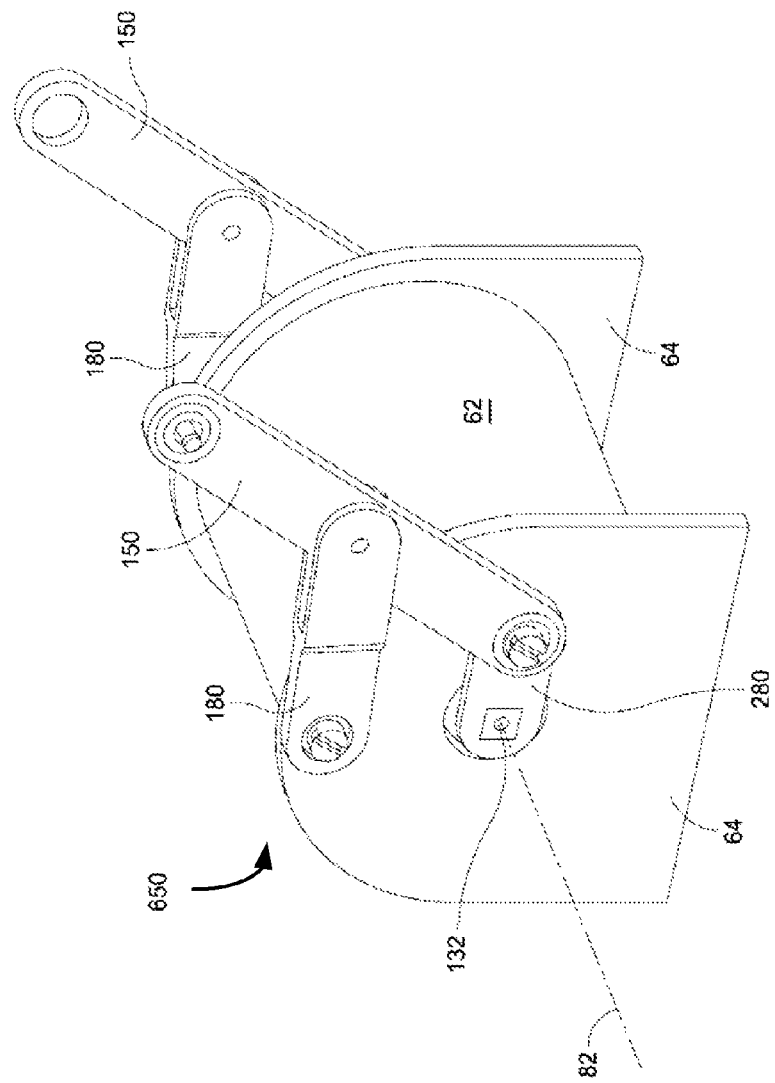
FIG. 16 is a perspective view of an alternative implementation of an actuator.

Referring to FIG. 15, in other implementations, the actuator 50 may be indirectly connected to the respective inlet and exhaust valves 740, 762. For example, the predetermined point P of the first link 150 can be connected to an inlet push rod 730. The push rod 730 actuates an inlet rocker arm 732 that rocks on a pivot axis 734. Rocker arm 732 includes a pair of actuating arms 736 each of which preferably carries a hydraulic lash adjuster 738. The lash adjusters 738 engage the pair of inlet valves 740. Although hidden in this view by the actuator 50 and the inlet push rod 730, another actuator 50 is connected to an exhaust push rod for actuating a primary rocker arm 754 which is pivotable on the same pivot axis 734 as the inlet rocker arm 732. The primary rocker arm 754 in turn engages a secondary push rod 756 which engages with a secondary rocker arm 758. An actuating arm of rocker arm 758 directly engages the exhaust valve 762. Like the previous implementation, the actuator 50 serves to position the inlet and exhaust valve 740, 762 relative to the cylinder block 718 based on control signals received from a controller (not shown). The controller receives signals including valve movement data from encoder signals indicating rotor position relative to the housing 62, and crankshaft position data. Based on these signals, the controller outputs control signals to the rotary motor 60 of the actuator 50 such that the position of the valve 740, 762 is controlled relative to the cylinder block 718.

Although the engine valve position control implementations illustrated here provide an actuator 50 for each engine valve 740, 762 of the cylinder 712, this is non-limiting. For example, a single actuator 50 could be used to control multiple valves. For example, a single actuator could simultaneously actuate multiple input valves coupled to a single combustion chamber.

Using the actuator 50 to control valve operation advantageously allows motion of the valves to be decoupled from rotation of the engine crankshaft. In addition, a fully controllable valve allows complete control of timing and lift, over the entire range of engine speeds. This allows valve operation to be optimized over all operating conditions. It also allows variation with operation, enabling operation in an engine efficiency mode, or in maximum power delivery mode. It makes engine cylinder de-activation easy, and allows more complex de-activation schemes. For example, rather than de-activating an entire cylinder bank as is current practice, a portion of a cylinder bank or an individual cylinder can be deactivated. In addition, use of actuator 50 to control valve operation allows allow an engine to be self started, without the need for a separate starter to rotate the crankshaft.

Using the engine valve control system described herein, including the actuator 50 provides conversion of rotary to linear motion in a manner that is well suited for this application in which the linear range of travel is maximized within a limited space. For example, unlike a linear actuator which must be arranged in line with the valve shaft and extend upwards from the valve stem, the actuator 50 can control a valve lift profile at will from a location to one side of the valve, and thus does not add height to the valve train. Location of the actuator 50 to the side of the valve can provide linear displacement of the valve without requiring a lever or rocker arm, which can significantly reduce friction losses and wear of the valve guides.

This feature, in combination with the compact size of the actuator 50, permits packaging of the actuators so that when multiple valves per cylinder are employed, multiple actuators can be fit around the cylinder or positioned remotely about the periphery of the cylinder while still providing full control of each valve.

Because the actuator 50 employs a rotary motor 60 which acts through a linkage to control valve position, the actuator 50 can be located away from the cylinder head 716. This is advantageous since this permits the actuator 50 and sensors to avoid high temperatures associated with cylinder exhaust valves and manifold. This increases the amount of power than can be dissipated in the coils of the actuator before thermal demagnetizaton temperatures are reached. In addition, since the actuator motors are located away from the valves themselves, design of cooling devices is simplified. For example, cooling jackets can be provided that surround all the actuator motors without interfering with other structures.

In the actuator 50, a rotary encoder 120 is used to sense position. This sensor is located with the rotary motor 60, away from the location of the valve. The rotary encoder 120 can be much less expensive and more reliable than linear position and velocity sensors. It also can be located in a position where it sees lower temperatures. Because the actuator 50 employs a rotary motor 60, design and manufacture of reliable sensors to detect valve position and velocity is relatively straightforward.

Because the actuator 50 employs a rotary motor 60, this device is well suited for use in the engine 700 since substantial peak power at high engine speeds is required to overcome cylinder cracking pressure and open the exhaust valves. This requirement puts extreme demands on the power electronics of the system, and also drives a need for maximum efficiency in the actuator. For the reasons discussed above, a rotary motor is inherently more efficient than, for example, an actuator employing linear motor. The relative efficiency of the rotary motor can be used to possibly downsize the motor itself, or to reduce the electrical power requirements, or both.

From a packaging perspective, the actuator 50 including the rotary motor 60 and linkage 52 has much lower profile than a linear motor, and due to the linkage connection between the motor and the valve, the actuator can be integrated with the valve train such that the rotary motors does not sit directly over the valves. For example, the actuator 50 can be disposed between cylinder banks of V engines. Moreover, a separate linkage (if necessary) can connect the point P of the linkage 52 to the valves. By locating the rotary motor of the actuator away from the valves, it becomes much easier to package an actively controlled multiple valve per cylinder system.

Precise control is needed to avoid having the valve collide with the valve seat. The particular relationship between torque and position obtained by the actuator 50 simplifies the control of the engine valve.

Referring to FIG. 16, actuator 650 is an alternative implementation of the actuator 50. The actuator 650 is substantially similar to the actuator 50, except that the end caps 100, 200 of the actuator 50 are modified to improve ease of assembly. In particular, the modified end caps (not shown) are formed having a reduced outer diameter, and the large diameter rotor bearings 89 which support the end caps 100, 200 are replaced with similar bearings of smaller diameter. Due to the reduced diameter of the modified end caps, a third link 280 is provided which corresponds to the first bar 116 of the four-bar linkage and is dimensioned accordingly.

Although the illustrated implementation is described as using specific motor and bearings, the present invention is not limited to these components and it is understood that the motor and bearings are selected based on the requirements of the specific application.

A selected illustrative embodiment of the mechanism for converting rotary motion to linear motion is described above in some detail. However, it should be understood that only structures considered necessary for clarifying the present invention have been described herein. Other conventional structures, and those of ancillary and auxiliary components of the system, are assumed to be known and understood by those skilled in the art. Moreover, while a working example of the present invention has been described above, the present invention is not limited to the working example described above, but various design alterations may be carried out without departing from the present invention as set forth in the claims.

What is claimed is:

1. An active vibration control device configured to control the position of a body, the device comprising:

at least one sensor configured to provide input signals corresponding to movement of the body in at least one direction;

a rotary actuator configured to control the position of the body, and a linkage comprising a pivotably-joined link connecting the rotary actuator to the body, the linkage connected to and driven by the rotary actuator, the linkage configured to convert rotary motion output from the rotary actuator into a linear motion of the body, a controller which, based on the input signals from the at least one sensor, provides control signals to the rotary actuator which acts through the linkage to position the body in the at least one direction, wherein the linkage is configured to convert the rotary motion of an output shaft of the rotary actuator into linear motion such that the torque required by the rotary actuator to produce a constant force at the body is substantially constant over a range of displacement of the body of at least four inches.

2. The active vibration control device of claim 1 wherein the torque required by the rotary actuator to provide a constant force at the body is substantially constant over a 100 degree angular rotation of an output shaft of the rotary actuator.

3. An active vibration control device configured to control the position of a body, the device comprising:

at least one sensor configured to provide input signals corresponding to movement of the body in at least one direction;

a rotary actuator configured to control the position of the body, and a linkage comprising a pivotably-joined link connecting the rotary actuator to the body, the linkage connected to and driven by the rotary actuator, the linkage configured to convert rotary motion output from the rotary actuator into a linear motion of the body, a controller which, based on the input signals from the at least one sensor, provides control signals to the rotary actuator which acts through the linkage to position the body in the at least one direction, wherein the linkage is connected to an output shaft of the rotary actuator on one side of the rotary actuator, and the device further comprises a second linkage connected to the output shaft of the rotary actuator on a side of the rotary actuator opposed to the one side.

4. An active vibration control device configured to control the position of a body, the device comprising:

at least one sensor configured to provide input signals corresponding to movement of the body in at least one direction;

a rotary actuator configured to control the position of the body, and a linkage comprising a pivotably-joined link connecting the rotary actuator to the body, the linkage connected to and driven by the rotary actuator, the linkage configured to convert rotary motion output from the rotary actuator into a linear motion of the body, a controller which, based on the input signals from the at least one sensor, provides control signals to the rotary actuator which acts through the linkage to position the body in the at least one direction wherein a rotor of the rotary actuator is prevented from rotating beyond a predetermined range.

5. The active vibration control device of claim 4 wherein the controller prevents the rotor from rotating beyond the predetermined range.

6. The active vibration control device of claim 4 wherein a mechanical stop member is provided to prevent the rotor from rotating beyond the predetermined range.

7. An active vibration control device configured to control the position of a body, the device comprising:

at least one sensor configured to provide input signals corresponding to movement of the body in at least one direction;

a rotary actuator configured to control the position of the body, and a linkage comprising a pivotably-joined link connecting the rotary actuator to the body, the linkage configured to convert rotary motion output from the rotary actuator into a linear motion of the body, a controller which, based on the input signals from the at least one sensor, provides control signals to the rotary actuator which acts through the linkage to position the body in the at least one direction, wherein;

the body comprises a vehicle seat, the seat is disposed in a vehicle, and the rotary actuator is disposed between a floor in the vehicle and the seat, wherein the linkage is connected to an output shaft of the rotary actuator on one side of the rotary actuator, and the device further comprises a second linkage connected to the output shaft of the rotary actuator on a side of the rotary actuator opposed to the one side.

8. An active vibration control device configured to control the position of a body, the device comprising:

at least one sensor configured to provide input signals corresponding to movement of the body in at least one direction;

a rotary actuator configured to control the position of the body, and a linkage comprising a pivotably-joined link connecting the rotary actuator to the body, the linkage configured to convert rotary motion output from the rotary actuator into a linear motion of the body, a controller which, based on the input signals from the at least one sensor, provides control signals to the rotary actuator which acts through the linkage to position the body in the at least one direction, wherein;

the body comprises a vehicle seat, the seat is disposed in a vehicle, and the rotary actuator is disposed between a floor in the vehicle and the seat, wherein a rotor of the rotary actuator is prevented from rotating beyond a predetermined range.

9. The active vibration control device of claim 8 wherein the controller prevents the rotor from rotating beyond the predetermined range.

10. The active vibration control device of claim 8 wherein a mechanical stop member is provided to prevent the rotor from rotating beyond the predetermined range.

* * * * *